United States Patent [19]
Lazzarini

[11] 3,851,572
[45] Dec. 3, 1974

[54] DRY PEELING APPARATUS
[75] Inventor: Louis P. Lazzarini, San Jose, Calif.
[73] Assignees: Genevieve I. Hanscom, Santa Cruz, Calif.; Genevieve I. Hanscom; Robert Magnuson; Lois J. Thomson, Trustees of the Estate of Roy M. Magnuson; a part interest to each
[22] Filed: Aug. 6, 1973
[21] Appl. No.: 385,845

Related U.S. Application Data
[60] Division of Ser. No. 299,760, Oct. 24, 1972, , which is a continuation-in-part of Ser. Nos. 826,377, May 21, 1969, abandoned, and Ser. No. 42,925, June 3, 1970, abandoned, Continuation of Ser. No. 148,410, June 1, 1971.

[52] U.S. Cl.......................... 99/451, 99/534, 99/625
[51] Int. Cl............................................. A23m 7/02
[58] Field of Search............. 99/451, 534, 584, 623, 99/624, 625

[56] References Cited
UNITED STATES PATENTS
| | | | |
|---|---|---|---|
| 2,997,085 | 8/1961 | Magnuson | 99/629 X |
| 3,460,162 | 8/1969 | Sijbring | 426/483 |
| 3,517,715 | 6/1970 | Graham | 426/241 |

*Primary Examiner*—Harvey C. Hornsby
*Assistant Examiner*—Alan Cantor
*Attorney, Agent, or Firm*—Naylor, Neal & Uilkema

[57] ABSTRACT

The present apparatus relates to the peeling of fruit and vegetables, potatoes, for example, wherein the potatoes are first subjected to lye, then to an infra-red treatment to activate the lye with respect to the peel, defects, and eyes of the potatoes. The treated loosened peel, defects, and eyes are then removed from the potatoes. These potatotes are subsequently washed and treated in a sulfite tank, and are used in frozen mashed potatoes, frozen French-fried potatoes, etc.

4 Claims, 8 Drawing Figures

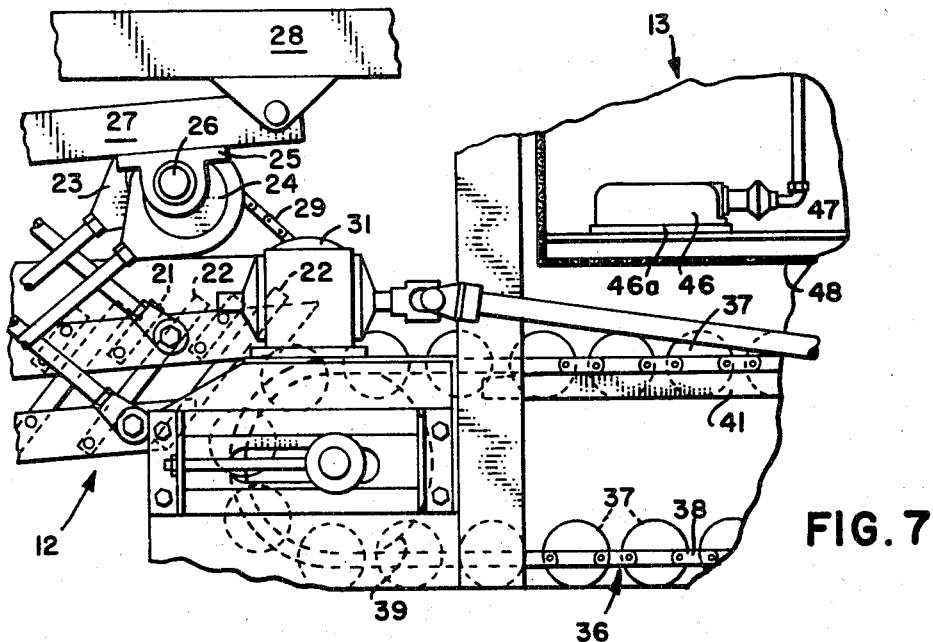
FIG. 7
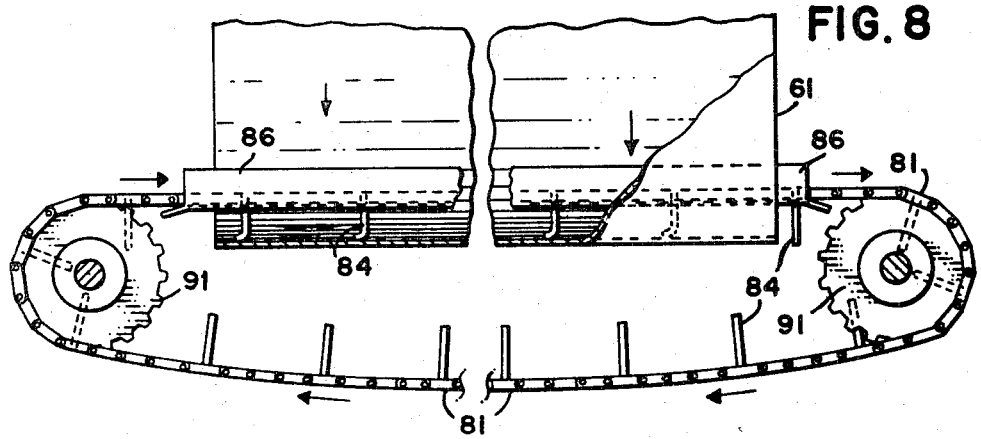
FIG. 8
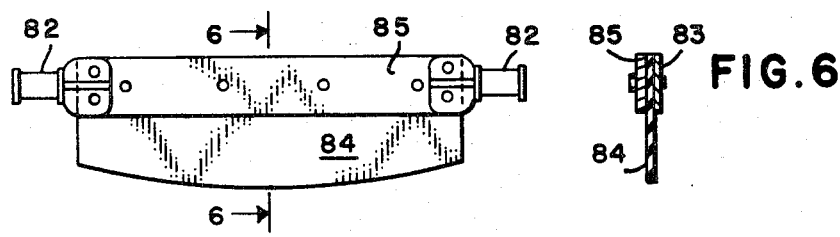
FIG. 5
FIG. 6

DRY PEELING APPARATUS

This application is a division of my co-pending application Ser. No. 299,760, filed Oct. 24, 1972, which in turn is a Continuation-In-Part of each of my now abandoned applications, Ser. No. 826,377 filed May 21, 1969, Ser. No. 42,925 filed June 3, 1970 and a Continuation of my application Ser. No. 148,410 filed June 1, 1971.

DESCRIPTION OF THE INVENTION

The present invention relates to the peeling of fruit and vegetable articles and it relates particularly to the peeling of Irish potatoes, and is concerned with an apparatus wherein substantially the entire surface of the potato will have the peel removed depending upon the age and condition of the potato and so that only a minimum amount of hand trimming will be required.

In general, potatoes in prime condition will be substantially wholly peeled including the eyes and defects, and very little trimming will be required. As the age of the potatoes increases and the season grows later, there are more defects present, i.e., more darkened portion of the skin, and some additional hand trimming will be required.

It is a general object of the invention therefore to provide an improved peeling apparatus for fruit and vegetables such as Irish potatoes.

Another object of the invention is to provide apparatus of the above character wherein the lye solution covering the potatoes is activated by means of infra-red ray treatment so that the entire skin surface portion of the potato including defects and eyes will be conditioned for removal, and subsequently subjected to a scrubbing peeling operation wherein a substantially dry peel is removed.

It is another object of the invention to provide improved apparatus for a dry process for peeling fruit and vegetables such as Irish potatoes.

It is a further object of the invention, therefor, to provide an improved clean-out mechanism for removing the peel and other debris derived from a peeling operation for fruit and vegetables.

A further object of the invention is to provide improved clean-out mechanism of the above character wherein the area of disposal of the scraped out peel and debris is localized so as to be easily handled.

Other objects and advantages of the invention will be apparent from the following description of a preferred embodiment thereof as illustrated in the accompanying drawings in which:

FIG. 5 is an enlarged view of the scraper blade as seen in FIG. 3;

FIG. 6 is a transverse sectional view through the cleaning and scraping blade shown in FIG. 5 as indicated by the line 6—6 in FIG. 5;

FIG. 7 is a fragmentary enlarged elevational view partially in section of a portion of the machine where the shuffle feed mechanism delivers potatoes to the roller conveyor; and FIG. 8 is a longitudinal sectional view through the clean-out mechanism and the plane of the view is indicated by the line 8—8 in FIG. 2.

Prior work has been done on the development of a dry peeling process for fruit and vegetables. For example, the patent to Willard U.S. Pat. No. 3,370,627 discloses the use of infra-red ray treatment of caustic coated fruit or vegetables to condition them for a peeling operation. Also, the U.S. Department of Agriculture at Western Utilization and Research Development Division, Albany, Calif. has further developed the dry peeling process using the caustic potatoes and the infra-red treatment together with a rubber roll peeler. This system is desired in the September 1968 issue of Food Processing, and in the Patent to Graham et al. U.S. Pat. No. 3,517,715 dated June 30, 1970. The instant invention has to do with further improvements of apparatus used in the process described in the above two prior publications and, more particularly, has to do with the provision of a full production line for a dry peeling process capable of handling several tons per hour of potatoes.

Figure 1:
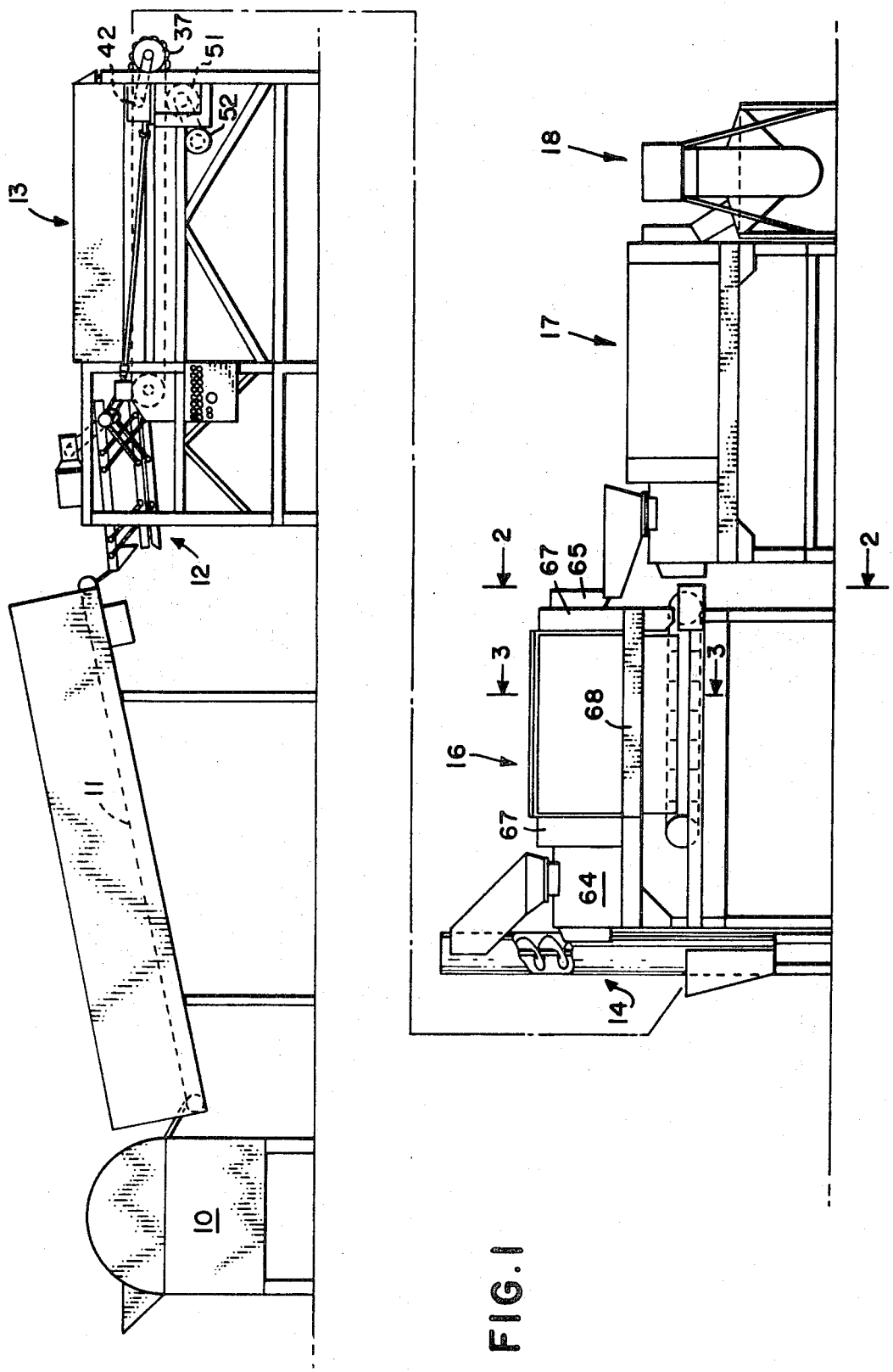
FIG. 1 is a schematic side elevational view of apparatus for carrying out the invention.

Referring to FIG. 1, the apparatus of the instant invention is shown schematically, and it includes a tank 10 containing an appropriate lye solution for coating the potatoes with lye. From the tank 10, the caustic coated potatoes are discharged onto a conventional conveyor belt 11 for a holding step for a given interval of time for the lye treatment. The potatoes are discharged from the conveyor 11 onto a shuffle feed conveyor 12 of a conventional type as illustrated in the patent to Magnuson et al., U.S. Pat. No. 2,792,929. The shuffle feed mechanism arranges the potatoes in rows with their length extending transversely of the direction of flow of the potatoes, and from the shuffle feed mechanism the potatoes are discharged in rows onto a roller conveyor of the infra-red treatment unit 13. The infra-red rays serve to activate the lye on the potatoes and thereby condition the desired surface portions for removal while they are being rotated by the rolls. The potatoes are discharged into an elevating screw 14 for lifting them up for discharge into a scrubber peeler mechanism 16 which serves to remove the loosened peel, eyes and defects of the potatoes. No water is used in the peel removal. After the removal of the desired surface portions, the potatoes are discharged into a washer unit 17 of conventional construction and from the washer unit 17 they are carried through a sulfite tank 18 for treatment to prevent discoloration.

Referring to FIG. 7, the infra-red treating unit 13 is illustrated in further detail. The shuffle feed mechanism 12 is shown as including respective sets of shuffle members 21 and 22 which are driven from respective eccentric mechanisms 23, 24 from a drive shaft 26 journaled in bearings 25 on a frame member 27 carried by an upper frame member 28. The shaft 26 is driven through a chain 29 from a motor and gear mechanism 31.

The discharge end of the shuffle feed, i.e., the last shuffle member 22 (FIG. 7) is disposed over the end of a roller conveyor 36 comprising a series of rolls 37 carried by a pair of conventional conveyor chains 38 and trained about respective spockets including an adjustable idler sprocket 39. The upper stretches of the chains 38 travel in tracks 41 (only one of which is seen in FIG. 7) which serve to rotate the rolls 37 as they are advanced by means of a drive through a gear box 42 (FIG. 1). These rolls 37 are timed with respect to the shuffle feed 12 to receive rows of potatoes arranged transversely with their length at a right angle to the direction of feed of the shuffle feed and the roller conveyor, so that these potatoes are in position to be rotated by the rolls 37 as they are passing beneath the infra-red head units 46, one of which is seen in FIG. 7. There is a rectangular array of these units 46 over the treating area of the infra-red treating unit 13. The bottom face 46a (FIG. 7) of the infra-red units 46 is perforated ceramic plate of conventional construction which is supported by suitable supporting strips 47. Spaced below these infra-red units 46 is a wire mesh screen 48 as a safety measure for catching any broken pieces of ceramic. These units 46 are fed a mixture of gas and air which burns below the plate 46a to heat these plates to a preferred temperature for optimum production of infra-red rays of about 1,700° to 1,800° F.

Means is provided for cleaning the rolls 37 of the roller conveyor and this means takes the form of a wire brush roll 51 (FIG. 1) which engages the outer surface of the rolls 37 as they start their return movement after discharging the potatoes into the vertical feed screw 14. The wire brush roll is suitably driven by a belt mechanism 52 to rotate in a clockwise direction as viewed in FIG. 1.

Figure 2:
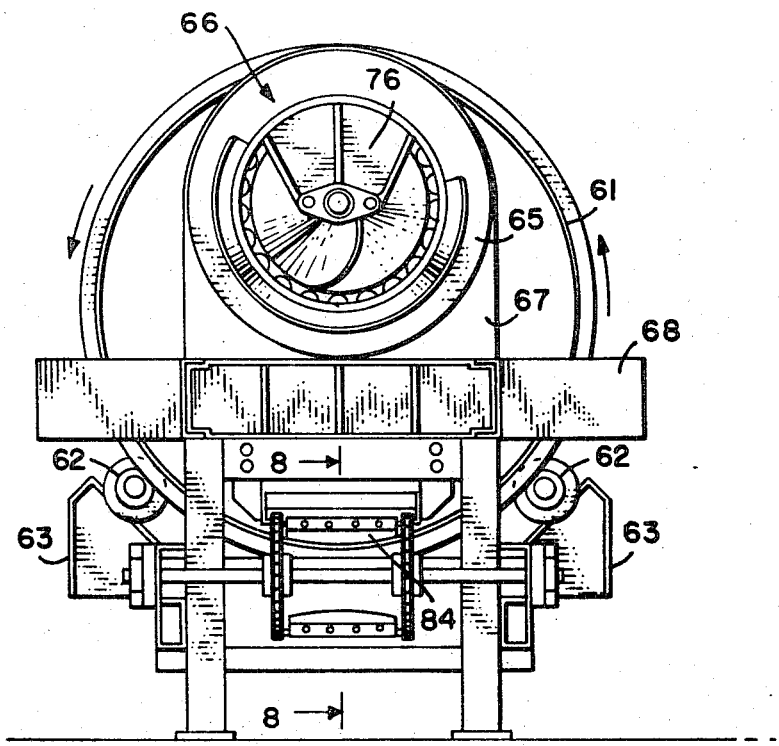
FIG. 2 is a transverse elevational view taken in a plane indicated by the line 2—2 in FIG. 1.

Referring to FIGS. 1, 2, 3 and 8, the scrubber peeler for dry peeling of the conditioned potatoes is illustrated. In general, this comprises a cylindrical housing 61 (FIG. 2) which is supported on trunnions 62, four in number, on yoke members 63 and the cylindrical peel collector housing 61 is rotated at a rather slow rate (about 1 or 2 rpm) by suitable drive means. Extending through the housing 61 is a rotatable peeler scrubber unit 66 including end castings 64 and 65 in which the cylindrical unit 66 is journaled. The end castings 64 and 65 are supported in upright frameworks 67 (FIG. 1 and 2) connected to a horizontal framework 68. The peeler scrubber unit includes an endless series of peeling and scrubbing rolls 71 which are journaled in respective end rings 72, and have extending through the center thereof a feed screw 73 whose shaft 74 is journaled in bearing brackets 76 at its respective ends. The brackets 76 are overhead brackets and leave the lower portion of the rolls exposed as seen in FIG. 2. Each roll comprises an array of molded fingers 77 (FIG. 4) which are in the form of truncated cones of resilient material such as synthetic rubber. The array of peeling rolls 71 is rotated in a counterclockwise direction (the same direction as the housing 61) as viewed in FIG. 3. The individual peeling rolls 71 are rotated in a clockwise direction as viewed in FIG. 3 and the speed of rotation is preferably in the range of from about 600 to 960 rpm where the peeling rolls themselves are about 3 inches in diameter. As the feed screw 73 carries the potatoes past the peeling rolls 74 the resilient fingers 77 impact the potatoes over their entire surface to give both a peeling and a scrubbing action to remove the skin, any defective portions, and also to remove the eyes of the potatoes. These fingers when impacting the potatoes bend and when released are self-cleaning of any peel or debris collected by virtue of their truncated cone shape and their snapping action in being restored to their radial position.

Figure 3:
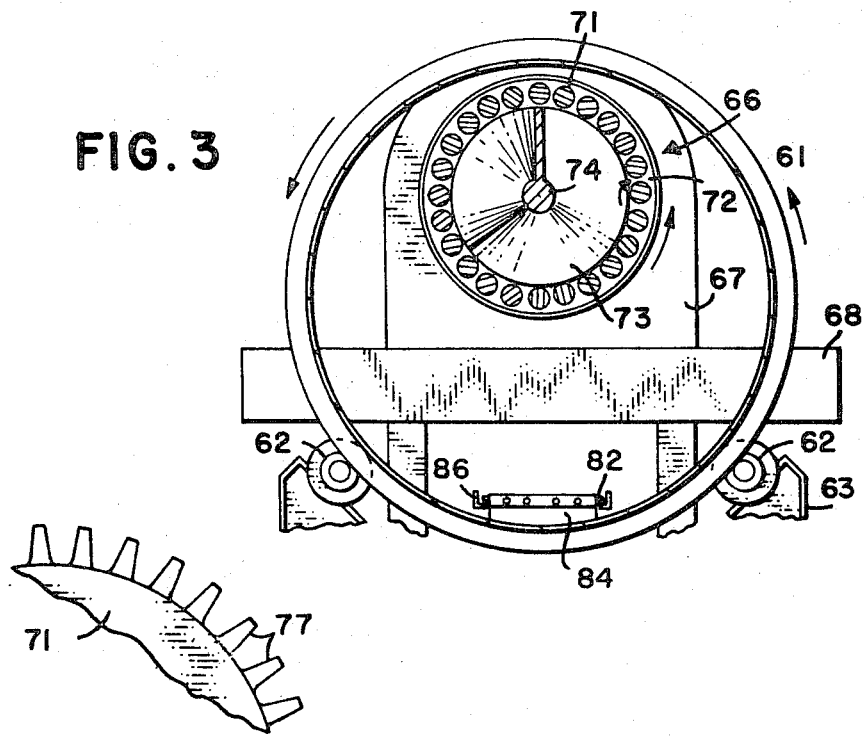
FIG. 3 is a transverse sectional view taken in a plane indicated by the line 3—3 in FIG. 1.
Figure 4:
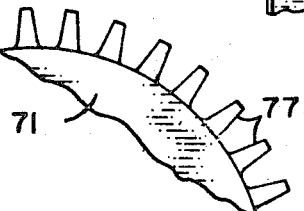
FIG. 4 is an enlarged end elevational view of one of the peeling rolls.

It will be seen referring to FIG. 3 that the peeler scrubber unit 66 has its axis offset upwardly from the axis of the peel collector housing 61 and is positioned in the upper portion of the space within the housing 61 so that there is a skin and debris trapping area to either side and below the peeler scrubber unit. The rolls 71 are rotated on their own axis in addition to the rotation of the array and the result is a centrifugal action acting on any peel or debris collected by the peeling studs or fingers 77 to cause this debris or skin to be flung from these and to be received on the walls of the housing 61.

A clean-out mechanism is provided as illustrated in FIGS. 2 and 7 and comprises a pair of chains 81 having spaced wings 82 projecting from certain of its limbs to which a transverse plate or bar 83 is bolted. This bar 83 extends between the two chains 81 and has bolted thereto a resileint clean-out blade 84 and a receiving plate 85. Each blade 84 has its outer edge formed at the same curvature as the inner surface of the cylinder 61 to effect an efficient wiping action. The chains 81 are carried in the angle shaped guides 86 and while the upper stretch of the clean-out conveyor is traveling through the drum, the chains 81 are lifted slightly above the guides 86 by the engagement of the flexible clean-out blades 84 with the cylinder 61. The blades 84 bend slightly while traveling through the cylinder and to effect a good cleaning action and also provide a flipping action as they pass over the discharge end of the cylinder 61. This clean-out conveyor 81 is carried on suitable sprockets 91 as seen in FIG. 8 and is driven in a suitable manner with reference to the speed of rotation of the drum 61 to provide an area for cleaning of about one-third of the length of the clean-out blades 84. The remaining length of the blade is used to catch overflow material or to let the pile of material spread during the clean-out action.

After the potatoes are peeled in a dry fashion in the scrubber peeler unit 16, they are carried into a washer unit 17 of conventional construction. From the washer 17, the peeled and washed potatoes are discharged into sulfite tank 18 so as to be maintained free of oxidation during delivery to their point of use.

While I have shown and described a preferred form of the invention, it is capable of variation and modification from the form shown so that its scope should be limited only by the scope of the claims appended hereto.

I claim:

1. In an apparatus for peeling fruit and vegetables having means for applying lye to the articles as a preliminary treatment; means for treating the articles as a preliminary treatment; means for treating the articles with infra-red rays comprising a feed mechanism for arranging articles treated with lye in rows, a roller conveyor for receiving rows of articles from the feed mechanism and for turning the articles as they are progressed thereby, and a source of infra-red rays disposed in overhead relation to said roller conveyor; and a peeler for receiving articles from said infra-red ray treating means comprising a cylindrical array of peeling rolls, each roll including resilient fingers projecting radially outwardly from the roll, a rotatable housing having said array of rolls disposed therein and being substantially coextensive in length with said rolls to receive pieces of peel and debris removed by said fingers and flung onto said housing, and means for removing peel and debris from said housing.

2. In an apparatus as recited in claim 1, in which said feed mechanism is a shuffle feed mechanism.

3. In an apparatus as recited in claim 1, in which said cylindrical array of peeling rolls is disposed in an off-center position with respect to said housing.

4. In an apparatus as recited in claim 2, in which means is provided for timing the reciprocating operation of said shuffle feed mechanism with respect to the valleys between adjacent rolls of the roller conveyor, whereby as a valley in the roller conveyor is presented to the discharge end of the shuffle feed mechanism the shuffle feed mechanism will discharge a row of articles into the valley.

* * * * *